(12) United States Patent
Kim

(10) Patent No.: US 10,063,630 B2
(45) Date of Patent: Aug. 28, 2018

(54) SYSTEM AND METHOD FOR SERVICE ORCHESTRATION IN DISTRIBUTED CLOUD ENVIRONMENT

(71) Applicant: ELECTRONICS AND TELECOMMUNICATIONS RESEARCH INSTITUTE, Daejeon (KR)

(72) Inventor: Tae Yeon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 241 days.

(21) Appl. No.: 15/001,623

(22) Filed: Jan. 20, 2016

(65) Prior Publication Data
US 2016/0294643 A1 Oct. 6, 2016

(30) Foreign Application Priority Data

Apr. 3, 2015 (KR) .................. 10-2015-0047242

(51) Int. Cl.
G06F 15/177 (2006.01)
H04L 29/08 (2006.01)
H04L 12/24 (2006.01)
H04L 12/26 (2006.01)

(52) U.S. Cl.
CPC .......... *H04L 67/10* (2013.01); *H04L 41/5054* (2013.01); *H04L 67/16* (2013.01); *H04L 41/12* (2013.01); *H04L 41/5096* (2013.01); *H04L 43/0817* (2013.01)

(58) Field of Classification Search
CPC ...... H04L 67/10; H04L 41/5054; H04L 67/16
USPC ......................................................... 709/222
See application file for complete search history.

(56) References Cited

U.S. PATENT DOCUMENTS

| 2010/0153482 | A1 | 6/2010 | Kim et al. | |
|---|---|---|---|---|
| 2012/0311157 | A1* | 12/2012 | Erickson | G06F 9/541 709/226 |
| 2012/0331150 | A1* | 12/2012 | Rao | G06F 9/5038 709/226 |
| 2013/0326566 | A1 | 12/2013 | Cho et al. | |
| 2014/0074973 | A1* | 3/2014 | Kumar | H04L 67/32 709/217 |

(Continued)

FOREIGN PATENT DOCUMENTS

| KR | 10-2013-0083726 A | 7/2013 |
|---|---|---|
| KR | 10-2014-0098671 A | 8/2014 |
| WO | 2010/151273 A1 | 12/2010 |

*Primary Examiner* — Vivek Srivastava
*Assistant Examiner* — Atta Khan
(74) *Attorney, Agent, or Firm* — LRK PATENT LAW FIRM

(57) ABSTRACT

The present invention relates to a system and a method for service orchestration capable of integrating network resources distributed in a cloud network to provide a service required by a service provider. The method includes: receiving a service profile from a service provider; analyzing the received service profile, and generating information on a virtual function and an application server used to provide a service as a service specification; setting a service flow to provide the service to a user based on the service specification; and transmitting a service execution control command according to the service flow to at least one micro data center.

19 Claims, 9 Drawing Sheets

(56) References Cited

U.S. PATENT DOCUMENTS

| | | |
|---|---|---|
| 2014/0078936 A1 | 3/2014 | Kim et al. |
| 2014/0156823 A1 | 6/2014 | Liu et al. |
| 2014/0317261 A1 | 10/2014 | Shatzkamer et al. |
| 2016/0197980 A1* | 7/2016 | Durairajan .............. H04L 67/10 709/223 |
| 2016/0205037 A1* | 7/2016 | Gupte .................... H04L 67/10 709/226 |

* cited by examiner

SYSTEM AND METHOD FOR SERVICE ORCHESTRATION IN DISTRIBUTED CLOUD ENVIRONMENT

CROSS-REFERENCE TO RELATED APPLICATION

This application is based on and claims the benefit of priority to Korean Patent Application No. 10-2015-0047242, filed on Apr. 3, 2015 in the Korean Intellectual Property Office, the disclosure of which is incorporated herein in its entirety by reference.

BACKGROUND OF THE INVENTION

1. Field of the Invention

The present invention relates to a system and a method for service orchestration capable of integrating network resources distributed in a cloud network to provide a service required by a service provider.

2. Description of the Related Art

As Internet becomes an indispensable element in a modern society, various services are provided through the Internet. In recent years, as Internet of Things (IoT), Machine to Machine (M2M), big data analysis, and cloud computing are developed, it is expected by people that communication between things is integrated with the Internet, and most knowledge and information are obtained, stored, and processed through an Internet space. According to such a trend in technology, in a technical side of a future Internet network, a research on software defined network (SDN) and network functions virtualization (NFV) has been actively performed.

A cloud computing technology achieves an effect of using an independent computing resource for each of a plurality of users by sharing a computing resource integrated based on a virtualization technology with the plurality of users. A cloud computing based service is extended to various types of business models including enterprises as well as general users. In particular, the cloud computing based service is spotlighted in that operation/management cost may be reduced and the utilization of the resource may be increased by hiring necessary resources from a cloud center.

An SDN technology is a programmable networking technology capable of providing a networking service satisfying the convenience of a user by separating a control plane and a transfer plane to configure a network in an abstractive form. According to the SDN technology, there is no need for existing network equipment requiring a complicated control. In particular, an environment capable of providing various application network services is provided to a network provider. The SDN technology is evaluated as a technology capable of creating various network equipment markets based on a standard interface by emerging from a specific vendor-oriented existing network equipment market in the market.

An NFV technology is a software networking technology for replacing a networking equipment technology based on existing high-performance hardware with a software networking technology, based on development of a computing technology and a software technology. Such a NFV technology includes a networking technology and a control management technology for implementing a switch or a router, and a network middle box (Layer 4-Layer 7) as well as a control plane. In particular, the NFV technology ensures extensibility and flexibility together with the cloud technology, and is evolved to a combination form of the networking technology and the computing technology.

As described above, the cloud computing technology, the SDN technology, and the NFV technology have respective unique characteristics and utilizations. The cloud computing technology is essential to use a virtualization based computing technology and has an effect of flexibly providing various application services. Meanwhile, the SDN technology may simplify an existing complicated and fastidious network operation procedure and achieve an application based networking which was impossible in the past. Further, the NFV technology may configure a flexible and extendable network function based on software within a short time.

As described above, the above technologies have their own characteristics and strong points, but there is no detailed method capable of obtaining a synergy effect by combining the above technologies. Accordingly, research and development, standardization, and commercialization for the above technologies are accomplished in a specified form for each technology.

For example, research and development on the cloud computing technology is performed on the basis of the view point of a cloud service provider based on a virtual server in a private cloud center or a public cloud center. Research and development on the SDN technology is performed in an aspect of improving a communication infra environment by a vendor of the network equipment and the like. Research and development on the NFV technology is performed in order to replace equipment such as existing hardware middle box with a software based tool.

In the current internet market, there is a need for various services which cannot be solved by a single technology. For example, a need for providing a cloud based networking service is increased, and a need for converting a network infra of a communication business operator into a cloud based infra is increased.

SUMMARY OF THE INVENTION

The prevent invention has been made in view of the above problems, and provides a networking technology between an application server and a virtual function in which a service is achieved through a cloud computing technology, and arranges and operates a virtual network function necessary for a service using a NFV technology, and implements a networking path based on a service flow through a SDN technology.

Various embodiments of the present invention may configure an application server and a virtual function in a distributed cloud environment and form a virtual network through a virtual link between the application server and the virtual function. An integrated service orchestration method for controlling a service flow according to various actual environment conditions is implemented in the virtual network.

According to an embodiment of the present invention, a service orchestration system in a distributed cloud environment includes: at least one micro data centre including a virtual function and an application server; and a service management apparatus including a service interface handler configured to analyze a received service profile and generate information on a virtual function and an application server used to provide a service as a service specification, and a service orchestrator configured to set a service flow to provide the service to a user based on the service specification and transmit a service execution control command according to the service flow to the at least one micro data centre.

The system and the method for service orchestration according to various embodiments of the present invention may easily provide various services in a form desired by a user, and in particular, may programmably provide and manage the service by closely interworking with virtualization, abstraction technologies such as the cloud computing technology, the SDN technology, and the NFV technology.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

The above objects, features, and advantages can be more clearly comprehended through the following description in relation to accompanying drawings. Accordingly, those skilled in the art can easily realize the present inventive concept. In the following description, if detailed description about well-known functions or configurations may make the subject matter of the disclosure unclear, the detailed description will be omitted.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, an exemplary embodiment of the present invention will be described more specifically with reference to the accompanying drawings.

Figure 1:
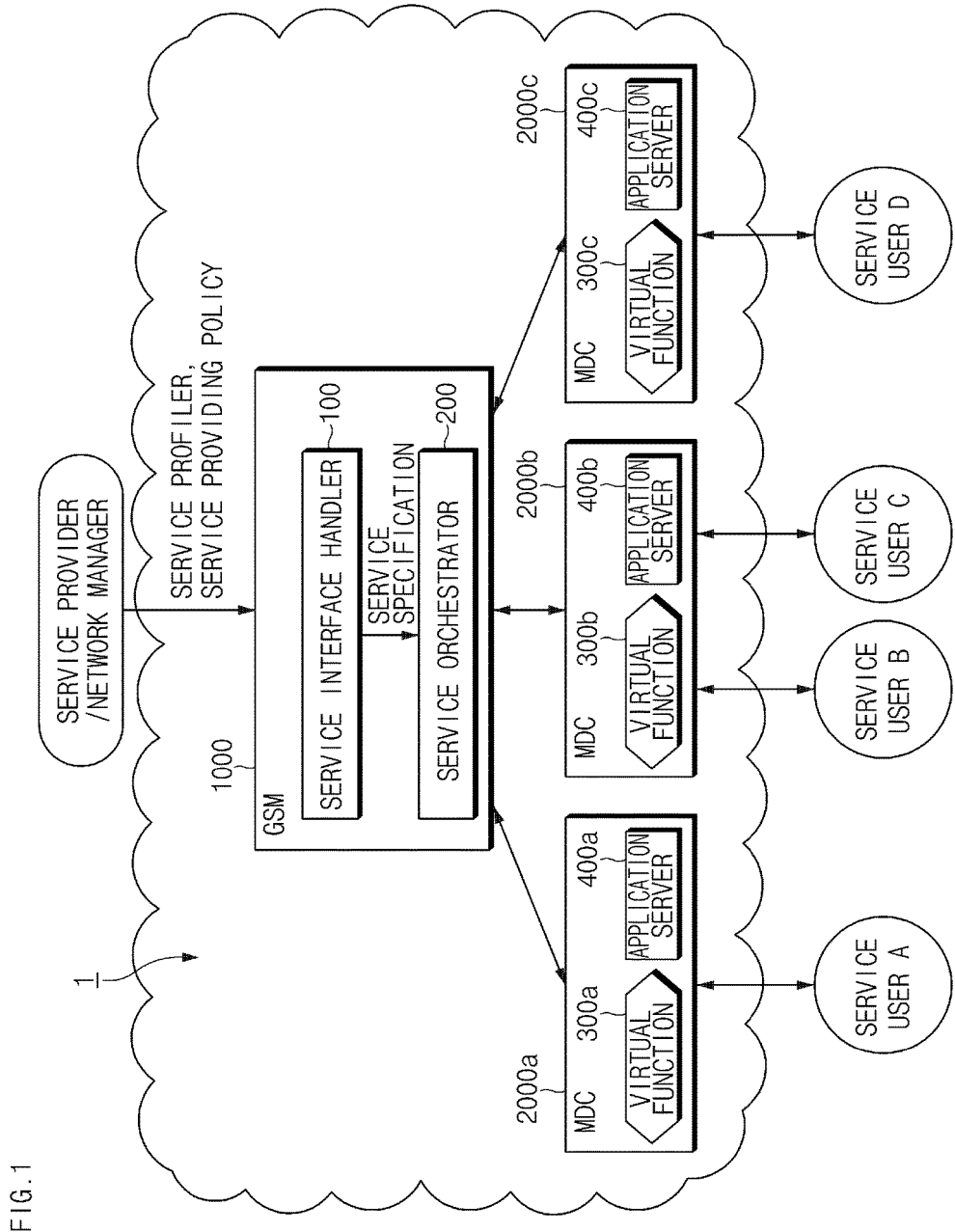
FIG. 1 is a diagram illustrating a service orchestration system according to an embodiment of the present invention.

FIG. 1 is a diagram illustrating a service orchestration system according to an embodiment of the present invention.

Referring to FIG. 1, a service orchestration system 1 in a distributed cloud environment may include a global service manager (GSM) 1000 and at least one Micro Data Centre (MDC) 2000a to 2000c.

A service provider may input a service profile of a service which will be offered to the GSM 1000 and a service user may receive the service through the MDCs 2000a to 2000c. Meanwhile, the network manager may input service policy information to the GSM 1000 together with the service profile.

The GSM 1000 may integrally control and manage cloud resources, that is, MDCs 2000a to 2000c distributed in the distributed cloud environment. The GSM 1000 may provide a service file input from the service provider and a service according to the service policy information to the service user. Further, the GSM 1000 may orchestrate the service according to various environment factors (policy of a manager and the like) which may be changed during execution of the service.

The GSM 1000 may be mounted in a computing device (e.g., server, workstation, and the like) equipped with at least one processor module, a communication module, and a storage module. For example, the GSM 1000 or a partial (or the whole) configuration of the GSM 1000 may be implemented by a virtual machine (VM), or a virtual machine manager (VMM).

The MDC 2000a to 2000c may include at least one virtual function 300 or an application server 400. For example, the virtual function 300a and the application server 400a of the MDC 2000a are virtually linked with a virtual function 300b and an application server 400b of the MDC 2000b and a virtual function 300c and an application server 400c of the MDC 2000c, and may provide a service according to a service flow to the service user according to a received service execution control command.

Figure 2:
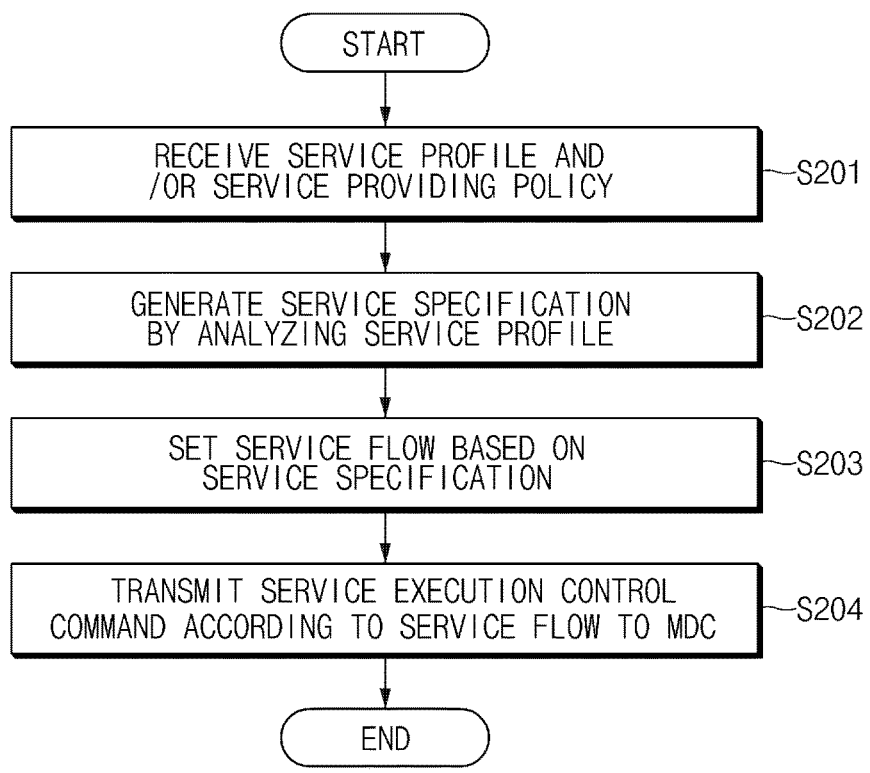
FIG. 2 is a flowchart illustrating a service orchestration method according to an embodiment of the present invention.

FIG. 2 is a flowchart illustrating a service orchestration method according to an embodiment of the present invention.

Referring to FIG. 2, the service orchestration system 1 in a distributed cloud environment according to an embodiment of the present invention may perform following operations.

At operation S201, a service interface handler 100 of a GSM 1000 may receive a service profile and/or a service providing policy from the service provider.

At operation S202, the service interface handler 100 of the GSM 1000 may analyze the service profile, and generate information on the virtual function and the application server used to provide the service as a service specification.

At operation S203, a service orchestrator 200 of the GSM 1000 may configure a service flow for providing the service to the user based on the service specification transferred from the service interface handler 100.

At operation S204, the service orchestrator 200 of the GSM 1000 may transmit a service execution control command according to the service flow configured at operation S203 to at least one of the MDC 2000a to 2000c.

Figure 3:
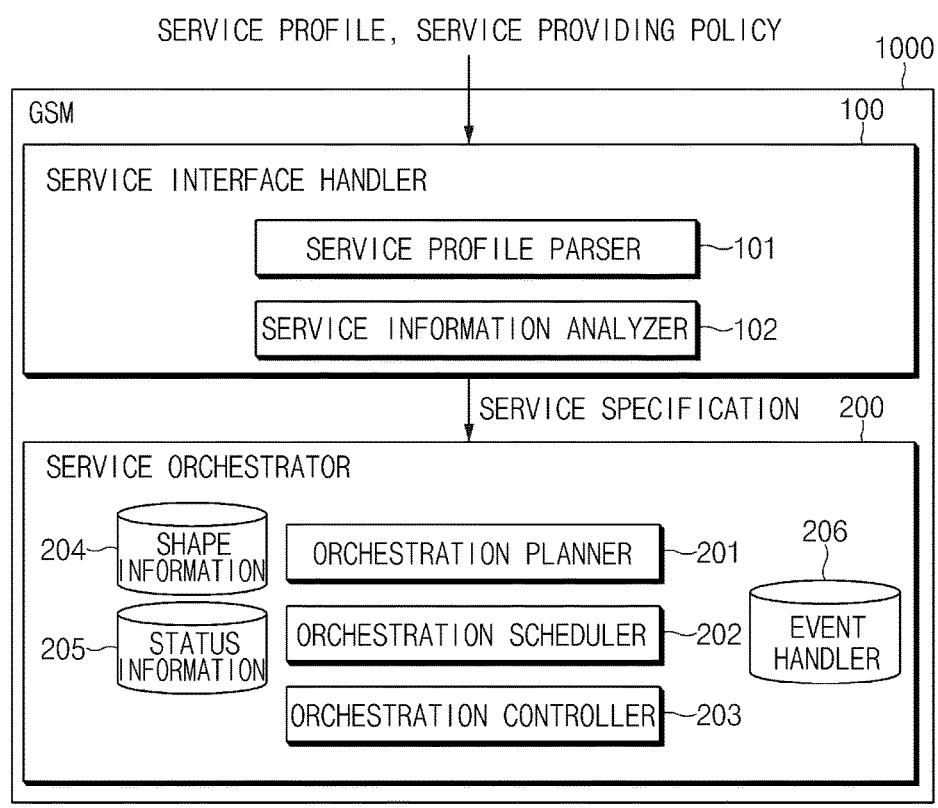
FIG. 3 is a block diagram illustrating a global service manager (GSM) according to an embodiment of the present invention.

FIG. 3 is a block diagram illustrating a global service manager (GSM) 1000 according to an embodiment of the present invention.

The GSM 1000 may include a service interface handler 100 and a service orchestrator 200.

The service interface handler 100 may include a service profile parser 101 and a service information analyzer 102. The service interface handler 100 may receive and process a service profile and/or a service providing policy from an upper service provider. The service specification may be generated as a result of the processing.

The service profile parser 101 may receive the service profile and/or the service providing policy. The service profile may include overall information necessary for providing the service such as contents of the service to be provided from the service provider, information on operation control of the MDC, and control information on execution, change, stop, and restart of the service. The service profile may be configured by abstractive natural languages. The service providing policy is a factor which causes influence upon the service flow, and may be received from the service provider or another subject (e.g., network manager) (described in detail later).

The service profiler parser 101 may classify the service indicated by the service profile according to attribute by parsing the service profile input from the service provider. In detail, the service profile parser 101 may classify attributes of the service according to item based on information included in the service profile: ① a kind and ② a type of a provided service, ③ a zone to which the service is provided, ④ an MDC and ⑤ a virtual function necessary for providing the service, ⑥ performances, ⑦ scaling conditions, ⑧ mobility conditions, and ⑨ chaining conditions of the MDC and the virtual function necessary for providing the service.

The service information analyzer 102 may analyze the attribute of the service classified according to item. Accordingly, service attribute detail information and environment condition information for providing (or changing) the service may be obtained. In this case, the service policy information may be considered as one of the environment condition information.

For example, service attribute detail information according to item may include below information.

Kind of the service: information on whether the service is a local service or a global service.

Type of the service: information on whether the service is an application service oriented service or a networking oriented service.

Service zone: information on a zone requesting the service in the case of the local service.

MDC 2000 information: information on performance required for each MDC, the minimum number of MDC 2000, and the maximum number of MDC 2000.

Information on the virtual (network) function and the application server: information on a function, performance, the minimum number of functions, and the maximum number of functions required for the virtual function and the application server necessary to provide the service Performance indicator: information on performance requirements viewed from a side of a service user, low_latency, high_bandwidth, and a service use frequency.

Scaling condition: information on a condition value of change such as scaling extension, shortening, enlargement, and reduction of the MDC or the virtual (network) function in a service orchestration (e.g., application service scale enlargement and the like in the case of 2000 session or more)

Mobility condition: information on a condition in which a live migration of the MDC is generated in the service orchestration (e.g., movement of the server in latency of 100 ms or more)

Chaining condition: information defining an environment condition and a chaining rule of an initial service when the initial service is provided, and information defining an environment condition and a chaining rule of a specific virtual function when the specific virtual function is changed according to the environment condition.

The environment condition information represents an environment condition to be considered when the service is initially provided or when the service is changed. Operation of the service to be offered may be changed according to the environment condition information.

Status condition: operation may be changed according to status of the network, the MDC, and the virtual function.

Time slot condition: service operation may be changed according to time slot.

Service level agreement (SLA) condition: service operation may be changed based on SLA.

Zone condition: service operation may be changed according to a service request zone.

Service flow condition: service operation may be changed according to the service flow.

Service providing policy: service attribute detail information may be changed according to a corresponding service providing policy when a certain policy is proposed and transmitted by the service provider or the service manager. For example, service scaling, service mobility, and service chaining among service attribute detail information may be changed according to the service providing policy.

That is, when the service scaling is changed, the number of the MDCs or the virtual functions providing the service may be changed (enlarged, shortened, increased, increased, reduced). Further, when the service mobility is changed, the function of migrating the MDC being executed or stopped to another host may be changed (thus, an existing user session and all service information move simultaneously so that continuity of the service may be ensured). Further, when the service chaining is changed, a chaining path of a flow of the service user may be changed according to a servicer user classification and environment condition information.

The service information analyzer 102 may generate a service specification including the above mentioned service attribute detail information and the environment condition information. The generated service specification may be transferred to the service orchestrator 200.

Figure 4:
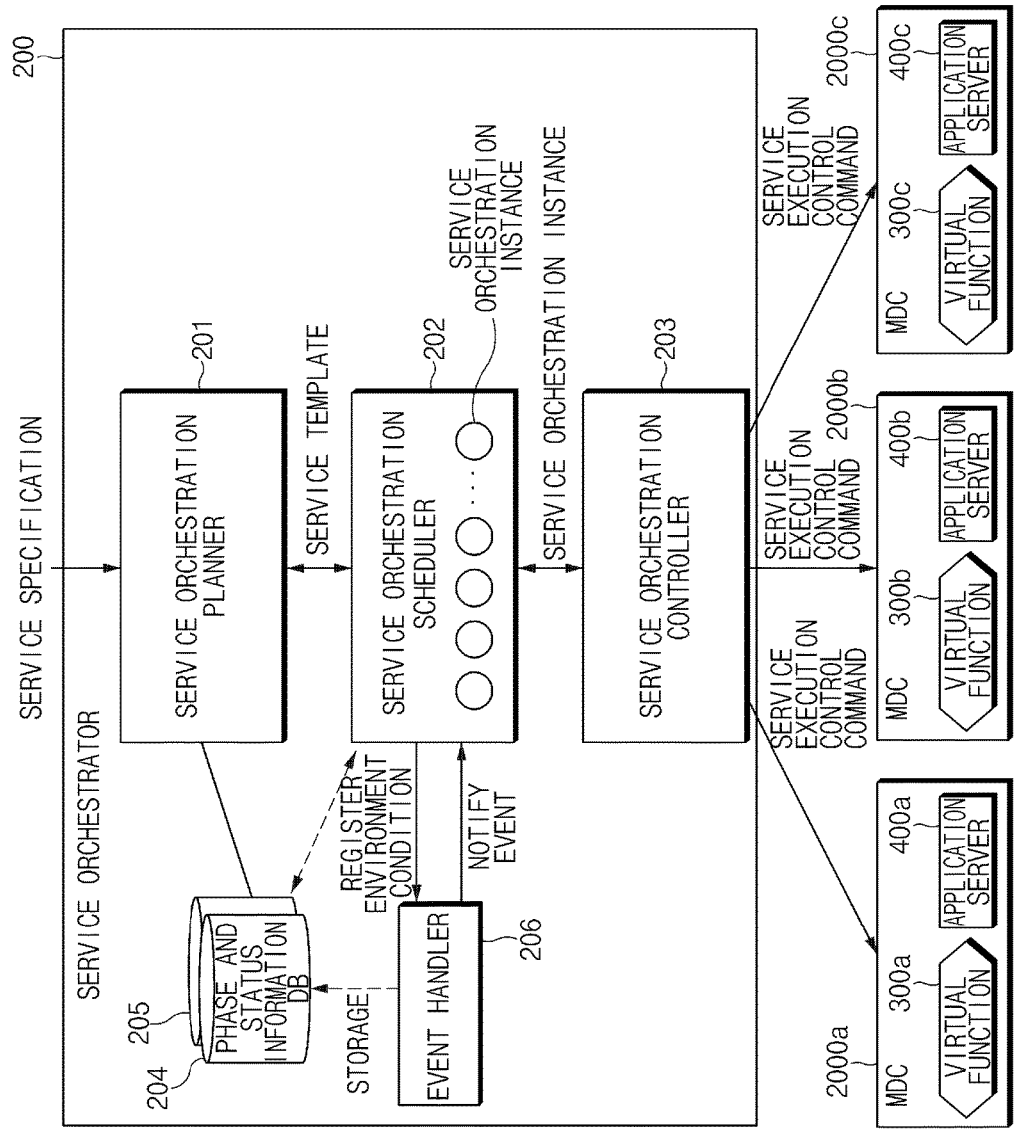
FIG. 4 is a diagram illustrating a service orchestrator of the global service manager (GSM)

FIG. 4 is a block diagram illustrating a service orchestrator 200 of the global service manager (GSM) 1000.

Referring to FIG. 4, the service orchestrator 200 may include a service orchestration planner 201, a service orchestration scheduler 202, a service orchestration controller 203, a shape information DB 204, a status information DB 205, and an event handler 206.

The service orchestration planner 201 may process a service specification received from the service interface handler 100 and generate a template.

In detail, the service orchestration planner 201 may analyze a service specification received from the service interface handler 100, and configure a virtual network from the service attribute detail information included in the service specification.

The service orchestration planner 201 may configure a virtual network according to the service specification with reference to the infra-structure shape information DB 204 and the infra-structure status information DB 205, and generate virtual network configuration information. The generated virtual network configuration information may be included in the service template together with the service attribute detail information and the environment condition information included in the service specification.

Figure 5:
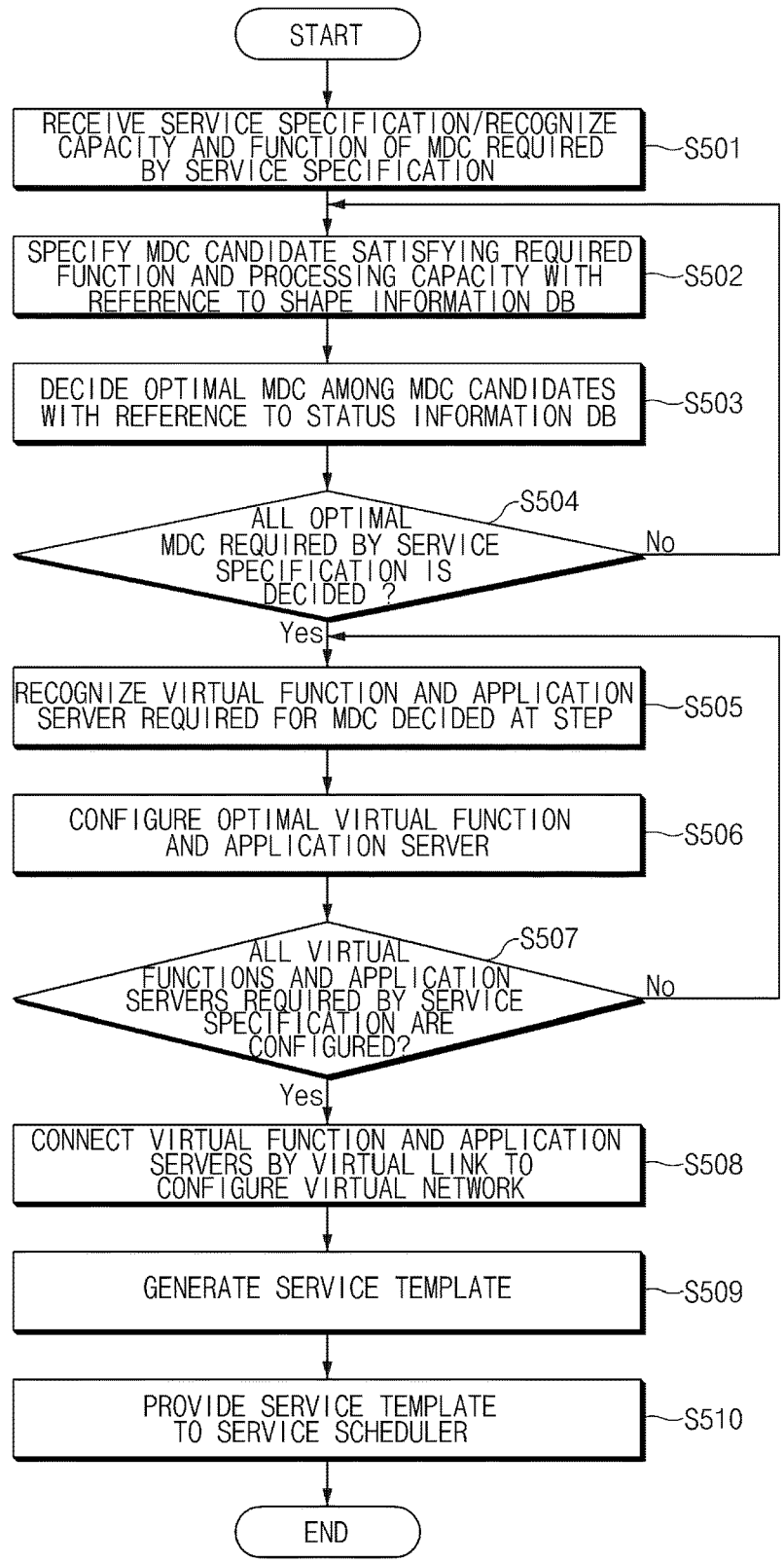
FIG. 5 is a flowchart illustrating an operation of a service orchestration planner according to an embodiment of the present invention.

FIG. 5 is a flowchart illustrating an operation of a service orchestration planner 201 according to an embodiment of the present invention.

Referring to FIG. 5, the service orchestration planner 201 may generate a service template by performing operation S501 to operation S510.

At operation S501, the service orchestration planner 201 may analyze the service specification transferred from the service interface handler 100, and recognize the capacity and the function of the MDC required by (the service attribute detail information of) the service specification.

At operation S502, the service orchestration planner 201 may specify an MDC candidate satisfying the function and the processing capacity of the MDC required by (the service attribute detail information of) the service specification in the service orchestration system 1 with reference to the shape information DB 204.

At operation S503, the service orchestration planner 201 may decide an optimal MDC from MDC candidates with reference to the status information DB 205. In order to decide the optimal MDC, service attribute, regional characteristic, and host environment may be considered.

At operation S504, the service orchestration planner 201 may determine whether an optimal MDC is decided with respect to all MDCs required by (the service attribute detail information of) the service specification. When the optimal MDC is not decided with respect to all MDCs required by the service specification, the process may return to operation S502 to repeat operations S502 and S503.

At operation S505, the service orchestration planner 201 may analyze (the service attribute detail information of) the service specification, and recognize the virtual function and the application server required for the MDC decided at operation S503.

At operation S506, the service orchestration planner 201 may configure the virtual function and the application server with respect to the MDC decided at operation 503. The virtual function and the application server may be configured to be mapped to the MDC and to be operated as an independent functional entity in a virtual network. Accordingly, a process of mounting software for the virtual function and the application server in the MDC may be included. Although the virtual function and the application server may be previously provided in the MDC, if there is no virtual function and application server required by the service specification, the MDC may be virtually configured, and the required virtual function and the application server may be mounted in the virtually configured MDC. Accordingly, the optimal virtual function and the application server may be obtained by considering the service attribute, the regional characteristic, and the host environment, and in this operation, the arrangement of the MDC, the virtual function, and the application server may be completed.

At operation S507, the service orchestration planner 201 may determine whether all virtual functions and application servers required by (the service attribute detail information of) the service specification are configured. When the all virtual functions and application servers are not configured, the process may return to operation S505 to repeat operations S505 and S506.

At operation S508, the service orchestration planner 201 may connect the MDC with the virtual function and the application servers with reference to (the service attribute detail information of) the service specification and the shape information DB 204 by a virtual link. Through the connection of the virtual link, a virtual network considering the attribute of the service, the regional characteristic, and the host environment may be configured. That is, as the result of the connection, the virtual network configuration information may be generated. Meanwhile, the virtual link means point-to-point connection based on Layer2 (L2), and is distinguished from physical connection.

At operation S509, the service orchestration planner 201 may generate a service template. The service template may include the virtual network configuration information generated at operation S508, together with the attribute detail information and the environment condition information included in the service specification.

At operation S510, the service orchestration planner 201 may provide the service template generated at operation 509 to the service scheduler 202.

Referring back to FIG. 4, the service orchestration scheduler 202 may generate a service orchestration instance based on the service template received from the service orchestration planner 201.

The service orchestration instance means that the service template is implemented in the service orchestration scheduler 202 in order to provide the service. That is, the service orchestration instance may select the MDC, the virtual function, and the application server using the virtual network configuration information, the service attribute detail information, and the environment condition information included in the service template, and configure a service flow based on the selected MDC, virtual function, and application server. The term 'service flow' may mean a series of paths connecting the virtual function with the application server in order to provide an actual service to a service user.

The service orchestration scheduler 202 may generate the service instance message (e.g., initial execution instance message, change execution instance message) according to the service orchestration instance and transfer the generated service instance message to the service orchestration controller 203. The service instance message may include information on the service flow and information on associated virtual function and application server.

For example, the service orchestration scheduler 202 may firstly generate the service orchestration instance, select the virtual function and the application server necessary for initial service execution according to the generated service orchestration instance, and decide the service flow with respect to the selected virtual function and application server. The service flow for initial service execution and information on the relevant MDC and virtual function may be included in the initial execution instance message.

Meanwhile, the service orchestration scheduler 202 may register the environment condition information included in the service template in the event handler 206. When the service orchestration scheduler 202 receives (is informed of) an event indicating that certain registered environment condition information is satisfied from the event handler 206, the service orchestration scheduler 202 may select the virtual function and the application server necessary for the execution of the service change, and connect the virtual function with the application server, with reference to the service attribute detail information and the virtual network configuration information included in the service template, according to the service orchestration instance. The service flow for the execution of the service change and information on the relevant virtual function and application server may be included in a change execution instance message.

Figure 6:
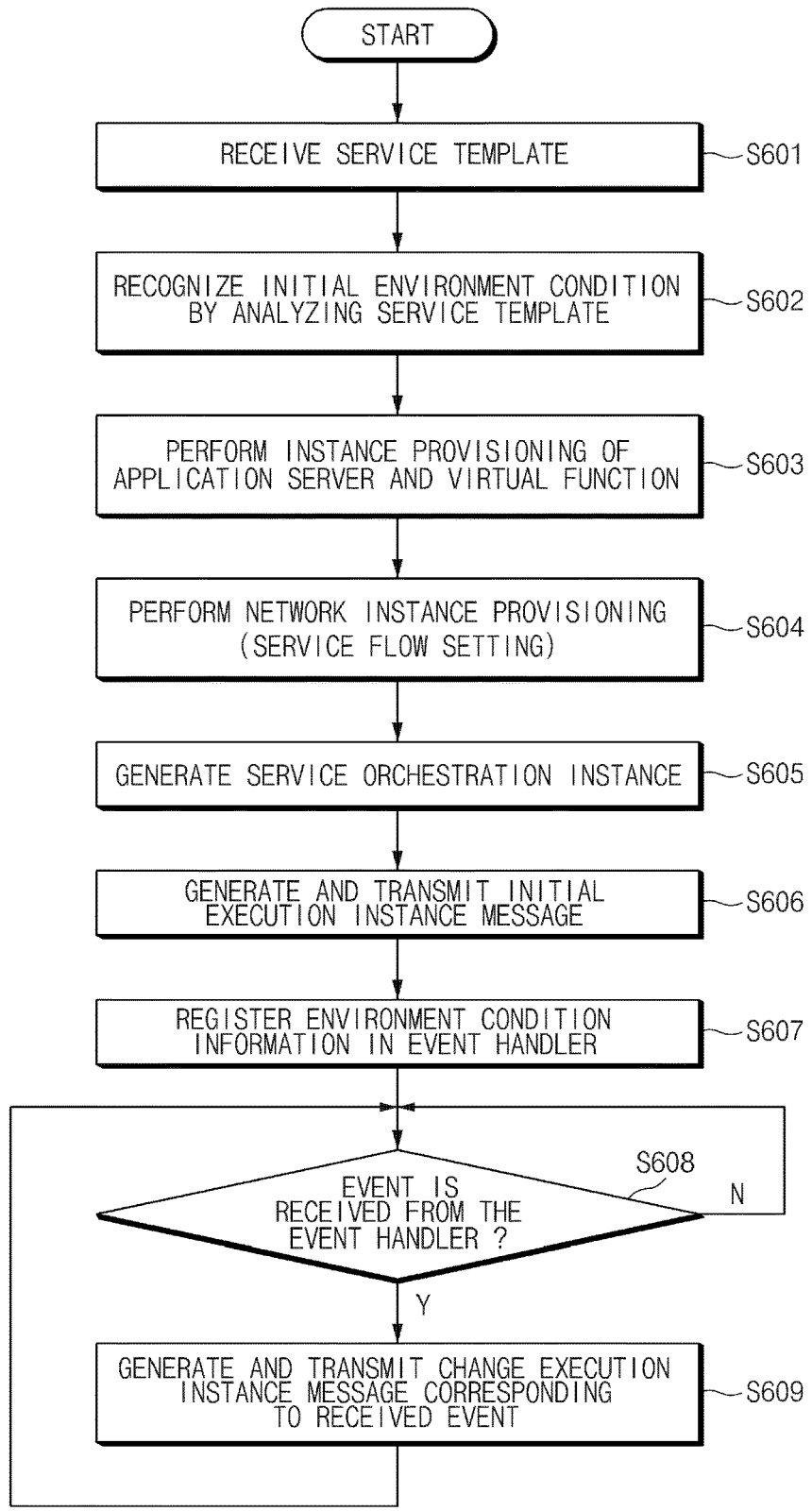
FIG. 6 is a flowchart illustrating an operation of a service orchestration scheduler according to an embodiment of the present invention.

FIG. 6 is a flowchart illustrating an operation of a service orchestration scheduler 202 according to an embodiment of the present invention.

Referring to FIG. 6, the service orchestration scheduler 202 may generate a service instance message (e.g., initial execution instance message, change execution instance message) by performing, for example, operation S601 to operation S609.

At operation S601, the service orchestration scheduler 202 may receive the service template from the service orchestration planner 201.

At operation S602, the service orchestration scheduler 202 may recognize an initial environment condition by analyzing the received service template. An initial service provisioning (e.g., operations S602 to S604) may be performed based on the analysis of the service template. The initial environment condition may include a service time slot, a service providing zone, SLA, and a service providing policy included in the received service template. Further, the initial service provisioning may include instance provisioning (operation S603) and network instance provisioning (operation S604).

At operation S603, the service orchestration scheduler 202 may perform the instance provisioning of the application server and the virtual function according to the initial environment condition recognized at operation S602. Further, the orchestration scheduler 202 may set an initial value of the virtual function and the application server. The service orchestration scheduler 202 may select the application server and the virtual function to be made instance by considering the initial environment condition such as the service time slot, the service providing zone, the SLA, and the initial policy, in order to accomplish the provisioning of the application server and the virtual function associated with the initial service.

At operation S604, the service orchestration scheduler 202 may perform network instance provisioning to set and connect the service flow. After the instance provisioning at operation S603, the service orchestration scheduler 202 may set the service flow for actually providing the service to the user through the network instance provisioning. Since the virtual network configuration information is configured by the service orchestration planner 201, the service orchestration scheduler 202 may configure a service chain (i.e., the service flow) composed of connection pair information between a connection point to which traffic of the service user is introduced and connection points of the application server or the virtual function. Since the service chain is one instance associated with a service connection, a plurality of different service chains (service flow) may be implemented in one virtual network according to the environment condition, the SLA, or the policy.

At operation S605, the service orchestration scheduler 202 may generate a service orchestration instance for each service, based on the initial service provisioning performed at operation S602 to operation S604, in order that the service may be harmonically performed.

At operation S606, the service orchestration scheduler 202 may generate an initial execution instance message according to the generated service orchestration instance. The initial execution instance message may be transmitted to the service orchestration controller 203. The initial execution instance message may include initial information related to the service flow and initial information related to the associated virtual function and application server.

At operation S607, the service orchestration scheduler 202 may register the environment condition information necessary for the service in the event handler 206. When the registered environment condition is satisfied during the service monitoring, the event handler 206 may notify a certain event to the service orchestration scheduler 202.

At operation S608, the service orchestration scheduler 202 may determine whether an event indicating that a specific environment condition is satisfied is received from the event handler 206. When the service orchestration scheduler 202 receives the event, the process may proceed to operation S609. When the service orchestration scheduler 202 does not receive the event, the service orchestration scheduler 202 may wait until the event is received (i.e., wait at operation S608).

At operation S609, when the service orchestration scheduler 202 receives the event from the event handler 206, the service orchestration scheduler 202 may generate a change execution instance message reflecting a condition indicated by the event. The generated change execution instance message may be transmitted to the service orchestration controller 203. Next, the process returns to operation S608 and may wait until other event is received.

Referring back to FIG. 4, the service orchestration controller 203 may control the virtual function and the application server distributed in the MDC based on the received service instance message (the initial execution instance message and the change execution instance message). In detail, the service orchestration controller 203 may transfer a service execution control command through an interface engaged with the distributed MDC. Accordingly, the service according to the service flow may be provided to the service user.

When the service orchestration controller 203 receives the initial execution instance message, the service orchestration controller 203 may obtain the service flow of the service to be firstly provided on the virtual network according to the initial execution instance message. The service orchestration controller 203 may transmit a service execution control command for the virtual function and the application server of the MDC so that the obtained service flow may be set and implemented on the virtual network.

When the service orchestration controller 203 receives the change execution instance message, the service orchestration controller 203 may obtain the service flow of the service which is changed according to the change execution instance message. The service orchestration controller 203 may transmit a service change control command for the virtual function and the application server of the MDC so that the obtained service flow may be changed and set, and implemented on the virtual network.

The shape information DB 204 may store the form (topology) of the MDC and the virtual network function distributed in the cloud service system.

The status information DB 205 may store the current state of the MDC and the virtual function actually distributed in the cloud service system. The status of the MDC and the virtual network function includes the regional characteristic and the host environment.

The event handler 206 may monitor the status of the MDC and the status of the virtual function and the application server included in the MDC, and may receive the environment condition information from the service orchestration scheduler 202 and store the received environment condition information corresponding to the orchestration instance.

When the status of the MDC and the status of the virtual function and the application server of the MDC satisfy a certain registered environment condition information (e.g., the time slot, the zone, and the SLA, and the like) through the monitoring, the event handler 206 may notify an event indicating that the certain environment condition information is satisfied to the service orchestration scheduler 202. Meanwhile, the monitored status information of the MDC and the virtual function may be registered in the status information DB 205.

The service orchestration system according to various embodiments of the present invention may configure a virtual function and an application server in a distributed cloud environment and connect the virtual function and the application server by a virtual link to configure a virtual network. In addition, a service orchestration method for providing various services may be implemented by controlling a service path according to various environment conditions.

The system and the method for service orchestration according to various embodiments of the present invention may easily provide various services in a form desired by the user. In particular, the service may be programmably provided and managed by closely cooperating with the virtualization, the abstraction technologies such as the cloud computing technology, the SDN technology, and the NFV technology.

Hereinafter, an embodiment of the present invention is described in detail.

[Embodiment]

The providing of an image media service is illustrated as an example of the present invention.

For example, an image media service provider may input a following profile to the GSM 1000 of the service orchestration system 1.

① A real-time image is provided or a video service is provided to a service user through a camera or a video server which is located all over a specific zone.

② An real time video input through a plurality of cameras may be synthesized and relayed or contents desired by a service user is transferred to the user from a video server according to a demand of the user. In this case, when a video input from the camera according to the demand of the user is a still image, a corresponding still image is excluded, and the input video is stored only when movement occurs, and is provided at the time desired by the service user. In some cases, a cache service is provided for public contents only.

③ Advertisement contents of personal taste is transmitted to the contents of the user in real time in association with a regional advertisement service according to a regional advertisement or a personal demand.

If the service profile including the above contents is input through an interface of a distributed cloud service platform, the service interface handler 100 may analyze attributes of the service by parsing the service profile to generate a service specification. The generated service specification may be transferred to the service orchestrator 200.

An example of the service specification is as follows.

Figure 7:
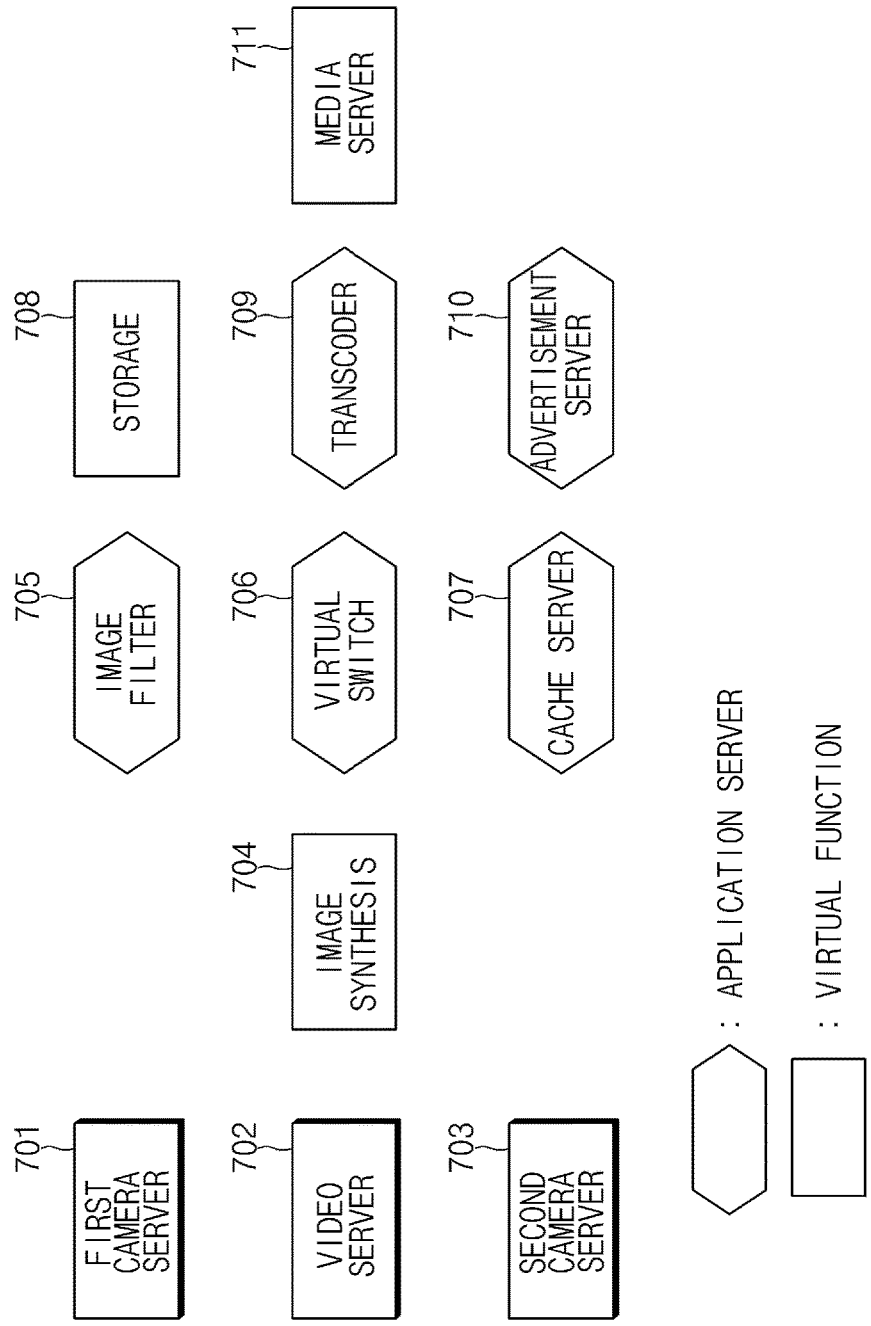
FIG. 7 is a block diagram illustrating a virtual function and an application service required by a service specification according to an embodiment of the present invention.

[Service Specification]
  Service id: service separator
  Kind of the service (information on whether the service is a local service or a global service): global service
  Type of the service: based on application service
  Service zone: not applicable
  Application server information: image synthesis and media, storage server, capacity and performance requirements, the minimum number of servers, the maximum number of servers, and the like
  Virtual (network) function information: functions and performance requirements, the minimum number of functions, and the maximum number of functions of an image filter, a virtual switch, a transcoder, a cache server, an advertisement server, a load balancer, and the like
  Performance indicator (performance requirements in terms of a user service, low_latency, high_bandwidth, service use frequency and the like): less than 100 ms latency, 100 mbp or more, 5 times, 2 hour/day
  Scaling condition: an application service scale is enlarged in the case of 2k session or more
  Mobility condition: move to a location close to a virtual server service user when 100 ms or more latency is maintained 2 hour
  Chaining condition: add an accelerator function according to SLA, and change a service path according to policy or time slot, and traffic amount The virtual function and the application service may be required, for example, as shown in FIG. 7, based on the application server information, the virtual function information, the performance index, the scaling condition, the mobility condition, and the chaining condition.

Next, the service orchestration planner 201 of the service orchestrator 200 received the service specification may configure the service template using information included in the service specification (particularly, service attribute detail specification), information of the shape information DB 204, and information of the status information DB 205. As described above, the service template may include the virtual network configuration information, the service attribute detail information, and the environment condition information.

When configuring the virtual network of the service template, the service orchestration planner 201 may consider the most suitable MDC 2000 and the zone of the suitable MDC 2000 to which the virtual function and the application server are provisioned, based on the service attribute detail information. In addition, the service orchestration planner 201 may connect the virtual function with the application server by a virtual link to establish a virtual network.

Figure 9:
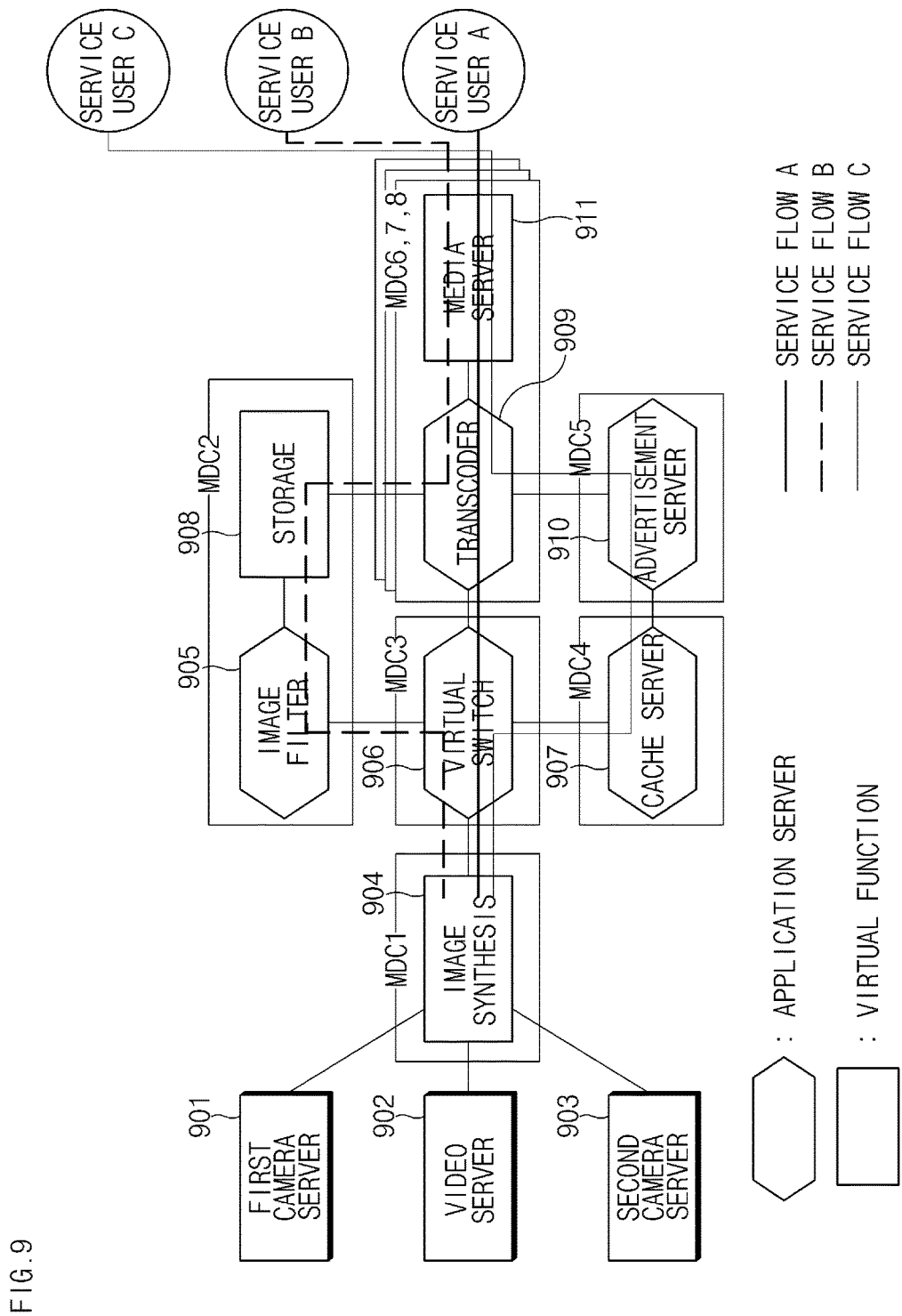
FIG. 9 is a diagram illustrating a service flow on a virtual network according to an embodiment of the present invention.

For example, the virtual network of the virtual template may be formed as shown in FIG. 9.

Figure 8:
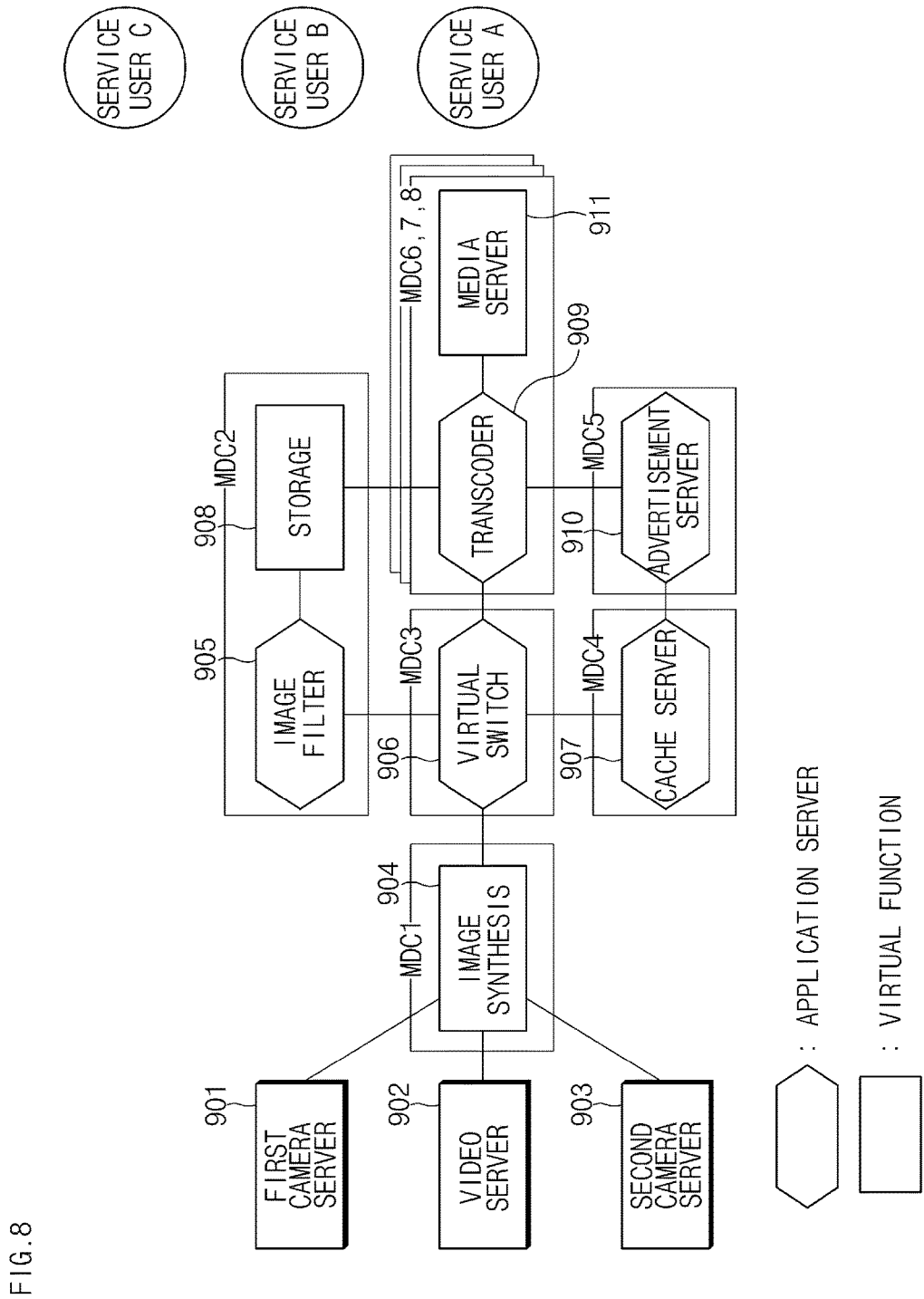
FIG. 8 is a block diagram illustrating a virtual network included in a service template according to an embodiment of the present invention.

Referring to FIG. 8, since the service of the present embodiment is a global service having no limitation in a service zone, the application servers or the virtual functions are optimally distributed in a plurality of MDCs 2000. That is, the application servers or the virtual functions are distributed to coincide with the use frequency of the service and the performance requirement of the service recorded in the service attribute detail information.

Meanwhile, in FIG. 8, the MDC, the virtual function, and the application servers according to the embodiment of the present invention are connected each other via the virtual link. In summary, the virtual network may be configured by arranging all application servers and virtual functions necessary for the service in the service template and connecting the application servers with the virtual functions by the virtual link.

Next, the service orchestration scheduler 202 may decide the service path, that is, the service flow which is actually provided on the virtual network of the service template.

In detail, the service orchestration scheduler 202 may generate the service orchestration instance, based on the service template received from the service orchestration planner 201. Further, the service orchestration instance may select the MDC, the virtual function, and the application server using the virtual network configuration information, the service attribute detail information, the environment condition information, and the like included in the service template to configure a service flow based on the selected MDC, virtual function, and application server.

The service orchestration scheduler 202 may firstly generate the service orchestration instance, select the virtual function and the application server necessary for the initial service execution according to the generated service orchestration instance, and determine the service flow with respect to the selected virtual function and the application server.

The service flow for the initial service execution and information on the relevant MDC and virtual function may be included in the initial execution instance message, and the initial execution instance message may be transmitted to the service orchestration controller 203.

For example, referring to FIG. 9, the service orchestration scheduler 202 may firstly generate the service orchestration instance, select a first camera server 901, a video server 902, a second camera server 903, an image synthesis server 904, a virtual switch 906, a transcoder 909, and a media server 911 which are necessary for the initial service execution according to the generated service orchestration instance, and may decide a service flow A for those elements.

The information on the service flow A for the initial service execution, and the information on the relevant MDC (MDC 1,3,6,7,8), the virtual function (the virtual switch 906, the transcoder 909), the application server (the first camera sever 901, the 1video server 902, the second camera 903, the image synthesis server 904, and the media server 911) may be included in the initial execution instance message, and the initial execution instance message may be transmitted to the service orchestration controller 203.

The service orchestration controller 203 may control the virtual functions (the virtual switch 906, the transcoder 909), and the application servers (the first camera server 901, the video server 902, the second camera server 903, the image synthesis server 904, and the media server 911) distributed in the MDCs (MDC 1,3,6,7,8) based on the received initial execution instance message. Accordingly, the service according to the service flow A may be provided to the service user A.

Eventually, according to the service flow A, an image photographed by the first camera server 901, a video recorded by the video server 902, and an image photographed by the second camera server 903 may be synthesized in the image synthesis server 904, and may be transcoded by the transcoder 909 via the virtual switch 906, and then may be provided to the service user A through the media server 911.

Meanwhile, when the environment condition information is registered in the service event handler 206 and the registered environment condition is satisfied, another service flow may be configured.

In detail, when the service orchestration scheduler 202 receives (is informed of) an event indicating that the registered environment condition information is satisfied, the service orchestration scheduler 202 may select the virtual function and the application server necessary for the execution of service change according to the service orchestration instance, and reconnect the selected virtual function and application server.

The information on the service flow for the execution of service change and the information on the relevant virtual function and the application server may be included in a change execution instance message. The change execution instance message may be transmitted to the service orchestration controller 203.

For example, referring to FIG. 9, when the service orchestration scheduler 202 receives (is informed of) an event indicating that the registered environment condition information (particularly, the service policy information) is satisfied, the service orchestration scheduler 202 may select the first camera server 901, the video server 902, the second camera 903, the image synthesis server 904, the image filter 905, the virtual switch 906, a storage server 908, a transcoder 909, and a media server 911 which are necessary for the execution of service change according to the service orchestration instance, and decide a service flow B for those selected elements.

The information on the service flow B for the execution of service change, and the information on the relevant MDC (MDC 1, 2, 3, 6, 7, 8), the virtual function (the image filter 905, the virtual switch 906, the transcoder 909), and the application server (the first camera server 901, the video server 902, the second camera server 903, the image synthesis server 904, the storage server 908, and the media server 911) may be included in the change execution instance message, and the change execution instance message may be transmitted to the service orchestration controller 203.

The service orchestration controller 203 may control the virtual function (the image filter 904, the virtual switch 906, the transcoder 909), and the application server (the first camera server 901, the video server 902, the second camera server 903, the image synthesis server 904, the storage server 908, and the media server 911) distributed in the MDCs (MDC 1, 2, 3, 6, 7, and 8) based on the received change execution instance message. Accordingly, the service according to the service flow B may be provided to a service user B.

Eventually, according to the service flow B, the image photographed by the first camera server 901, the video recorded by the video server 902, and the image photographed by the second camera server 903 may be synthesized in the image synthesis server 904, may be image-filtered by the image filter 905 via the virtual switch 906, may be stored in the storage server 908, may be trans-coded by the transcoder 909, and may be provided to the service user B through the media server 911.

In the same manner, a service user C may receive the service according to a service flow C including an operation of caching by the cache server 907 and an operation of inserting advertisements by the advertisement server 910, as well as the service according to the service flow B.

Meanwhile, the above described method of the present invention may be achieved by a computer program. Further, a code and a code segment configuring the program may be easily inferred by a computer programmer in the art. Further, the created program may be stored in a computer readable recording medium (information storage medium), and may be read and executed by a computer to implement the method of the present invention. Further, the recording medium may include all types of computer readable recording media.

Specific implementations according to the present invention are just examples, and do not limit the spirit and scope of the present invention at all. In order to simplify the specification, the description of circuit arrangements according to the related art, control systems, software, and other functional sides of the above systems may be omitted. Further, connection of lines and connection members between constituent elements shown in drawings illustrate a functional connection and/or physical or circuitry connection, and may be presented as various functional connections, physical connections, or circuitry connections which may be replaced or added in a real device. In addition, if there is no detailed mention such as "essential" or "important", the constituent element may not be an essential configuration to apply the present invention. In the specification (particularly, in the claims) of the present invention, the term "the above" and a similar term thereof may include both of the singular expression and the plural expression. In addition, when a range is described in the present invention, the present invention includes an invention to apply an individual value included in the range (unless the context indicates otherwise), each individual value configuring the range is described in a detailed description of the present invention. A use of all examples or exemplary terms (for example, etc) is solely for illustrative purposes. Unless the use of all examples or exemplary terms is limited on claims, the spirit and scope of the present invention is not limited due to the above examples or the exemplary terms. In addition, it should be understood that numerous other modifications and embodiments can be devised according to a design condition and factors by those skilled in the art that will fall within the spirit and scope of the principles of claims or equivalents thereof.

What is claimed is:

1. A service management apparatus, comprising:
   at least one of a handler and an orchestrator being configured and executed by a processor using algorithm associated with least one non-transitory storage device for performing a service orchestration in a distributed cloud environment, the handler and orchestrator comprising,
   a service interface handler configured to analyze a received service profile, and to generate information on a virtual function and an application server used to provide a service as a service specification; and
   a service orchestrator configured to set a service flow to provide the service to a service user based on the service specification, the service flow indicating a series of paths on a virtual network connecting the virtual function with the application server in order to provide an actual service to the service user, and the service specification including at least one of a service identification, a kind of service, a type of service, information of the application server, virtual network function information, performance indicator, scaling condition, changing condition, and
   to transmit a service execution control command for the virtual function and the application server according to the service flow to a micro data centre including the virtual function or the application server, the service flow being set and implemented on the virtual network, wherein
   the service orchestrator comprises an event handler configured to monitor status of the virtual function and the application server, and
   in response to detection of certain environment condition information is satisfied through the monitoring, to notify an event indicating that the certain environment condition information is satisfied to the service orchestration scheduler, and the certain environment condition information is included in the service template, the certain environment condition information includes at least one of a time slot, a time zone, and a service legal agreement.

2. The service management apparatus of claim 1, wherein the service profile is formed of an abstract natural language.

3. The service management apparatus of claim 1, wherein the service interface handler comprises:
   a service interface parser, executed by the processor, configured to classify a service indicated by the service profile according to attribute; and
   a service information analyzer, executed by the processor, configured to analyze the attribute of the classified service, and to generate detail information of the attribute of the service including information on the virtual function and the application server and environment condition information for providing the service as the service specification.

4. The service management apparatus of claim 1, wherein the service orchestrator comprises:
   a service orchestration planner, executed by the processor, configured to analyze the service specification, to configure the virtual network connecting the virtual function with the application server by a virtual link, and to generate a service template by adding the virtual network to the service specification; and
   a service orchestration scheduler, executed by the processor, configured to set the service flow on the virtual network, based on the service template.

5. The service management apparatus of claim 4, wherein the service orchestrator, executed by the processor, configured to generate the service execution control command based on a service instance message, and the service instance message is transmitted from the service orchestration scheduler, and comprises information on the set service flow.

6. The service management apparatus of claim 4, wherein the service orchestrator comprises a shape information database configured to store a topology of the distributed cloud environment and a status information database configured to store a status of a micro data centre included in the distributed cloud environment, and the orchestration planner refers to the shape information database and the status information database in order to configure the virtual network.

7. The service management apparatus of claim 1, wherein the service orchestration scheduler is configured to change and set the service flow based on the notified event.

8. A service orchestration system in a distributed cloud environment, the service orchestration system comprising:
   at least one micro data centre including a virtual function and an application server; and
   a global service manager including at least one of a handler and an orchestrator being configured and executed by a processor using algorithm associated with least one non-transitory storage device for performing a service orchestration in a distributed cloud environment, the handler and orchestrator comprising,
   a service interface handler configured to analyze a received service profile and to generate information on a virtual function and an application server used to provide a service as a service specification, and
   a service orchestrator configured to set a service flow to provide the service to a service user based on the service specification, the service flow indicating a series of paths on a virtual network connecting the virtual function with the application server in order to provide an actual service to the service user, and the service specification including at least one of a service identification, a kind of service, a type of service, information of the application server, virtual network function information, performance indicator, scaling condition, changing condition, and to transmit a service execution control command according to the service flow to the at least one micro data centre, wherein the global service manager and the at least one micro data centre are communicated to integrate network resources distributed in a cloud network to provide a service required by a service provider.

9. The service orchestration system of claim 8, wherein the service interface handler comprises:

a service interface parser, executed by the processor, configured to classify a service indicated by the service profile according to attribute; and a service information analyzer, executed by the processor, configured to analyze the attribute of the classified service, and to generate detail information of the attribute of the service including information on the virtual function and the application server and environment condition information for providing the service as the service specification.

10. The service orchestration system of claim 8, wherein the service orchestrator comprises:

a service orchestration planner, executed by the processor, configured to analyze the service specification, to configure the virtual network connecting the virtual function with the application server by a virtual link, and to generate a service template by adding the virtual network to the service specification; and a service orchestration scheduler, executed by the processor, configured to set the service flow on the virtual network, based on the service template.

11. The service orchestration system of claim 10, wherein the service orchestrator, executed by the processor, configured to generate the service execution control command based on a service instance message, and the service instance message is transmitted from the service orchestration scheduler, and comprises information on the set service flow.

12. The service orchestration system of claim 10, wherein the service orchestrator comprises a shape information database configured to store a topology of the distributed cloud environment and a status information database configured to store a status of a micro data centre included in the distributed cloud environment, and the orchestration planner refers to the shape information database and the status information database in order to configure the virtual network.

13. The service orchestration system of claim 10, wherein the service orchestrator comprises an event handler configured to monitor status of the virtual function and the application server, and to notify an event indicating that a certain environment condition information is satisfied to the service orchestration scheduler when the certain environment condition information is satisfied through the monitoring, and information on the certain environment condition is included in the service template, the certain environment condition information including a time slot, a time zone, and a service legal agreement.

14. The service orchestration system of claim 13, wherein the service orchestration scheduler is configured to change and set the service flow based on the notified event.

15. A computer-implemented method for performing a service orchestration in a distributed cloud environment, via a virtual network, the method comprising the operations of:

(a) receiving a service profile from a service provider;

(b) analyzing the received service profile, and generating information on a virtual function and an application server used to provide a service as a service specification, the service specification including at least one of a service identification, a kind of service, a type of service, information of the application server, virtual network function information, performance indicator, scaling condition, changing condition;

(c) setting a service flow to provide the service to a service user based on the service specification, the service flow indicating a series of paths on the virtual network configured by connecting the virtual function with the application server in order to provide an actual service to the service user; and (d) transmitting a service execution control command for the virtual function and the application server according to the service flow to at least one micro data centre, the service flow being set and implemented on the virtual network.

16. The method of claim 15, wherein operation (b) comprises the operations of:

(b-1) parsing the service profile, and classifying a service indicated by the service profile according to attribute; and (b-2) analyzing the attribute of the classified service, and generating detail information of the attribute of the service including information on the virtual function and the application server and environment condition information for providing the service as the service specification.

17. The method of claim 15, wherein operation (c) comprises the operations of:

(c-1) configuring the virtual network connecting the virtual function with the application server by a virtual link by analyzing the service specification;

(c-2) generating a service template by adding the virtual network to the service specification; and (c-3) setting the service flow in the virtual network based on the service template.

18. The method of claim 17, wherein operation (c-1) comprises an operation of referring to a shape information database and a status information database in order to configure the virtual network, and the shape information database stores a topology of the distributed cloud environment and the status information data stores a status of the micro data centre included in the distributed cloud environment.

19. The method of claim 15, wherein operation (d) comprises an operation of generating and transmitting the service execution control command based on a service instance message including information on the set service flow.

* * * * *